E. WEIL.
PNEUMATIC TIRE.
APPLICATION FILED MAY 22, 1911.
1,034,748.
Patented Aug. 6, 1912.
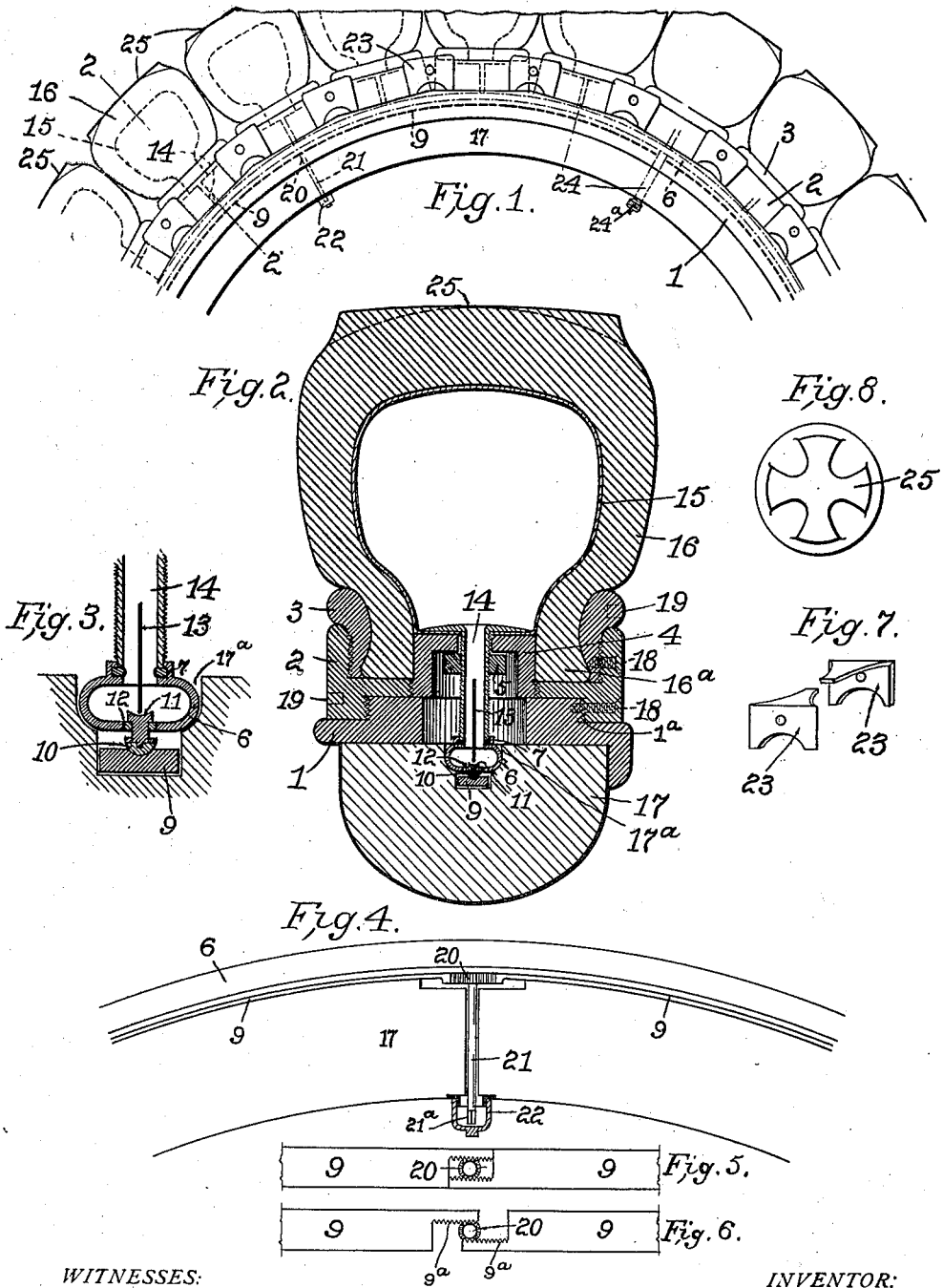
WITNESSES:
INVENTOR:
Emile Weil,
by Spear Middleton Donaldson & Spear
ATTORNEYS.

UNITED STATES PATENT OFFICE.

EMILE WEIL, OF NEW ORLEANS, LOUISIANA.

PNEUMATIC TIRE.

1,034,748.  Specification of Letters Patent.  Patented Aug. 6, 1912.

Application filed May 22, 1911. Serial No. 628,808.

*To all whom it may concern:*

Be it known that I, EMILE WEIL, citizen of the United States, residing at New Orleans, Louisiana, have invented certain new and useful Improvements in Pneumatic Tires, of which the following is a specification.

My present invention relates to improvements in pneumatic or inflatable tires for vehicle wheels.

Among the objects of the invention are to provide a tire which shall be equal in all respects in resiliency, efficiency, and durability to the ordinary tire, and yet one in which the ordinary troubles and disadvantages due to accidental deflation are avoided.

Another object is to provide a tire which, while being a complete article and capable as such of being applied to the wheel felly, and being inflated from a single valve in the ordinary manner, is yet composed of a plurality of members or sections which are independent of each other in the use of the tire upon the road to the extent that the puncturing or accidental deflation of one or more does not affect the others, the weight being sustained by the adjoining sections or members so that damage to the deflated member or members is prevented, and the tire may be used in the ordinary manner until some point is reached where it is convenient to effect repair.

Still another object is to provide means by which a member which has been accidentally deflated may be readily repaired, and this without removing the outer case of the section from its rim.

Other objects and advantages will appear from the following specification.

The invention includes the novel features of construction and arrangement and combination of parts hereinafter described and particularly set forth in the appended claims.

A tire constructed in accordance with my invention is illustrated in the accompanying drawing, in which:

Figure 1 is a side elevation of a portion of a wheel rim with my improved tire applied thereto; Fig. 2 is a section on line 2—2 of Fig. 1; Fig. 3 is an enlarged detail view of the valve mechanism, being taken on the same section as is Fig. 2; Fig. 4 is a longitudinal sectional elevation of the felly and circumferential air tube showing the means for operating the individual valves; Figs. 5 and 6 are detail views of the valve operating bands; Fig. 7 is a detail perspective view of certain filling pieces which I find it desirable to use on heavier types of tires; and Fig. 8 is a view of the bearing surface of one of the individual tire members or sections.

Referring by reference characters to this drawing, the numeral 1 designates the rim of the wheel which may be applied to and secured upon a felly shown at 17 in the ordinary or any desired manner. This rim is designed to carry the individual tire members of which the number and size will correspond to the size of the wheel and the weight to be carried thereby. The said rim 1 is provided at suitable intervals with raised circular bosses or projections $1^a$ which have threaded peripheries upon which are screwed the tire cups 2. Within these tire cups are screwed the tire cups 3, which, in connection with the central spools 4, serve to clamp the lower edges of the outer cases in place. The cups 3 are formed in halves or divided, so that after they have been unscrewed from the main tire cups, they may be separated to disengage them from the enlarged lower ends $16^a$ of the outer case 16. Within each outer tire case 16 is located an inner tube 15 which, as also the outer case, may be of the ordinary or any desired construction, and each inner tube is provided with a valve tube 14 which may also be of the ordinary or any desired construction, and has within it a valve also of the ordinary construction and hence not shown; the valve stem of which, however, which is indicated at 13, is made long enough to project beyond the tube, as indicated. The valve stem is provided with a lock nut 5 screwed upon the threaded outer portion of the valve stem, which may be clamped against the flange of the spool 4.

The inner ends of all of the valve tubes 14 are connected by a common air tube 6, arranged circumferentially within the recess $17^a$ in the rim 17 of the wheel, an airtight connection being effected between this common air tube and the individual valve tubes 14 by a washer 7. This common air tube 6 is provided with a single valve tube 24 provided with its own valve and valve cap 24ª, which cap may be removed to permit the attachment of an air pump by which air may be supplied to pump up all of the individual tire members simultaneously. In order to insure these being always pumped or inflated to equal pressure, I provide means by which the individual valves in the valve tubes 14 may all be opened simultaneously. This means comprises two circumferentially arranged sliding bands 9 extending each substantially half way around the rim, which have rack sections 9ª on the ends thereof, designed to be engaged by a gear 20, fast on the shaft 21, extending radially inward through the felly and provided with a square end 21ª for the reception of a wrench or key by which the shaft may be turned and the bands 9 moved circumferentially. The band 9 has depressions, as clearly shown in Fig. 3, in which are seated the rounded ends of buttons, which buttons are preferably made of two sections 10 and 11, the upper section 11 having an enlarged head resting on the inside of the tube, and the inverted shank of which passes through the central opening of the disk 12 removably threaded into the main air tube 6 and capable of being removed when the button needs to be replaced. The end 11 is preferably concave, as shown, and forms a seat for the end of the valve stem 13, and the relation of the parts is such that when the rounded ends of the buttons rest in the depressions of the bands 9, the valve stems 13 will be in such position as to allow the valves to all be closed. When, however, it is desired to open all of the valves, the rotation of the shaft 21 and gear 20 will move the bands 9 circumferentially or longitudinally in opposite directions, causing the walls of the depressions to act as cams and force the buttons outwardly and through contact with the valve stems 13, unseating the valves.

The projecting end of the shaft 21 is preferably provided with a removable cover 22. The main tire cups 2 and the inner cups 3 may be provided with any convenient means for unscrewing them, as, for instance, by openings 19 to receive a suitable wrench, and locking means may be provided to prevent any accidental unscrewing, as indicated by set screws 18. In order to further strengthen this construction for specially heavy wheels, I may provide filling blocks such as indicated at 23 and shown in detail in Fig. 7, which are designed to be placed between the adjacent cups 2, and held together by bolts.

To prevent skidding, I prefer to provide the outer faces of the tire shoes with raised portions 25 preferably of the shape indicated in Fig. 8 for the purpose of giving a better gripping effect, and this also increases the resiliency of the tire.

It will be noticed that in my construction as specifically illustrated and described, all parts pertaining to each particular tire member or section are circular, and this has the effect of rendering any particular adjustment unnecessary in screwing each member into place, and furthermore, makes each section capable of being turned without producing any detrimental effect, there being a possibility of such turning action in the motion of the steering wheels, for example.

I claim as my invention:

1. In combination a rim having a plurality of circular threaded bosses or projections, a plurality of tire holding cups having internally threaded flanges engaging said thread bosses, cup-shaped shoes having their edges held within said cup-shaped members, inflatable tubes or bags within said shoes and means for inflating said inflatable tubes.

2. In combination, a rim having a plurality of circular threaded bosses or projections, a plurality of tire holding cups having internally threaded flanges engaging said thread bosses, each of said tire holding cups having a central projection, cup-shaped shoes having their edges held between said cup-shaped members and projections and inflatable tubes or bags within said shoes and means for inflating same.

3. In combination, a rim having a plurality of circular threaded bosses or projections, a plurality of cup-shaped members having internally threaded flanges engaging said bosses and having internally threaded outwardly projecting flanges, divided shoe holding rings threaded to engage said projecting flanges and inflatable tubes within said shoes with means for inflating same.

4. In combination a rim having a plurality of circular threaded bosses or projections, a plurality of tire holding cups having internally threaded flanges engaging said threaded bosses, each of said tire holding cups having a central opening and a cylindrical plug or spool removably seated in and projecting through said opening, cup-shaped shoes having their edges held within said cup-shaped members and clamped against the projecting portion of said plug or spool, inflatable tubes or bags within said shoes, and removable for repair and replacement through said central openings on removal of the plugs, and means for inflating said inflatable tubes.

5. In combination a rim having threaded projecting bosses, a plurality of cup-shaped tire holding members having internally threaded flanges engaging said bosses and having internally threaded outwardly projecting flanges, divided shoe-holding rings threaded to engage said outwardly projecting flanges, said cup-shaped members having central openings, plugs or spools having a screw-threaded engagement with said central openings, and inflatable tubes within said shoes with means for inflating them, substantially as described.

In testimony whereof, I affix my signature in presence of two witnesses.

EMILE WEIL.

Witnesses:
 JAMES M. SPEAR,
 BENNETT S. JONES.

Copies of this patent may be obtained for five cents each, by addressing the "Commissioner of Patents, Washington, D. C."